(12) United States Patent
McDonald (10) Patent No.: US 11,064,842 B2
(45) Date of Patent: Jul. 20, 2021

(54) WASHING BUCKET FOR HOUSEHOLD, COMMERCIAL AND INDUSTRIAL USE FOR CLEANING MOPS AND FOR CHEMICAL CLEANING

(71) Applicant: Tim McDonald, Missouri City, TX (US)

(72) Inventor: Tim McDonald, Missouri City, TX (US)

( * ) Notice: Subject to any disclaimer, the term of this patent is extended or adjusted under 35 U.S.C. 154(b) by 512 days.

(21) Appl. No.: 15/993,913

(22) Filed: May 31, 2018

(65) Prior Publication Data
US 2018/0271333 A1    Sep. 27, 2018

Related U.S. Application Data

(63) Continuation-in-part of application No. 14/877,519, filed on Oct. 7, 2015, now Pat. No. 10,456,812, which
(Continued)

(51) Int. Cl.
*A47J 47/18*    (2006.01)
*A47L 13/59*    (2006.01)
(Continued)

(52) U.S. Cl.
CPC ............... *A47J 47/18* (2013.01); *A22C 17/08* (2013.01); *A22C 21/0061* (2013.01); *A22C 25/02* (2013.01); *A23N 12/02* (2013.01); *A47L 13/58* (2013.01); *A47L 13/59* (2013.01); *B08B 3/102* (2013.01)

(58) Field of Classification Search
CPC .................................. A47J 47/01; A47J 47/18

USPC ........ 452/173; 119/200, 201, 204, 205, 207, 119/209, 211, 214–218, 221, 224, 226,
(Continued)

(56) References Cited

U.S. PATENT DOCUMENTS 3,630,369 A    12/1971  Nichols
3,985,101 A *  10/1976  Thompson ............. A01K 61/59
                                                      119/207
(Continued)

FOREIGN PATENT DOCUMENTS

| CN | 107684406 A | 2/2018 |
| TW | 201117762 A | 6/2011 |
| WO | 2017/143135 A1 | 8/2017 |

OTHER PUBLICATIONS

International Search Report and Written Opinion of the ISA for related PCT/US2018/052645.

*Primary Examiner* — Richard T Price, Jr.
(74) *Attorney, Agent, or Firm* — Egbert, McDaniel & Swartz, PLLC (57) ABSTRACT

A washing bucket has a container having an interior defined by wall and a bottom, a fluid inlet affixed to the wall of the container so as to communicate with the interior of the container in order to deliver a fluid into an interior of the container, and a connector affixed to the fluid inlet at an end exterior of the container. The fluid inlet is positioned adjacent to a bottom of the container. The connector is adapted to allow a hose or a conduit to be connected to the fluid inlet. A pipe is connected to the fluid inlet. The pipe has a plurality of apertures adapted to direct the fluid from the fluid inlet into the interior of the container. The pipe extends generally vertically upwardly from the fluid inlet.

20 Claims, 6 Drawing Sheets

Related U.S. Application Data is a continuation-in-part of application No. 14/812,545, filed on Jul. 29, 2015, now Pat. No. 9,408,412, which is a continuation-in-part of application No. 14/550,195, filed on Nov. 21, 2014, now Pat. No. 9,320,286.

(60) Provisional application No. 62/640,261, filed on Mar. 8, 2018.

(51) Int. Cl.
| | | |
|---|---|---|
| *A22C 25/02* | (2006.01) | |
| *B08B 3/10* | (2006.01) | |
| *A22C 21/00* | (2006.01) | |
| *A22C 17/08* | (2006.01) | |
| *A47L 13/58* | (2006.01) | |
| *A23N 12/02* | (2006.01) | |

(58) Field of Classification Search
USPC ........ 119/232, 234, 236, 245, 248, 249–252, 119/259–261, 269
See application file for complete search history.

(56) References Cited

U.S. PATENT DOCUMENTS

| | | |
|---|---|---|
| 4,161,799 A | 7/1979 | Sorrells |
| 4,815,160 A | 3/1989 | Smith |
| 5,210,886 A * | 5/1993 | Coe, III ............... E03C 1/23 4/665 |
| 5,288,022 A | 2/1994 | Sesser |
| 5,333,353 A | 8/1994 | Taylor |
| 5,368,235 A | 11/1994 | Drozdoff et al. |
| 5,976,266 A | 11/1999 | Anderson et al. |
| 6,000,094 A | 12/1999 | Young |
| 6,374,867 B1 * | 4/2002 | Maiuro ............... A47J 47/18 141/115 |
| 6,962,286 B2 * | 11/2005 | Mawatari ............ G06Q 20/06 235/380 |
| 6,976,286 B1 | 12/2005 | Sanabria |
| 7,363,877 B2 * | 4/2008 | Christensen .......... A01K 63/02 119/207 |
| 8,950,361 B1 * | 2/2015 | Pierce ................... A01K 63/04 119/200 |
| 10,773,279 B2 * | 9/2020 | McDonald ............ A46B 17/06 |
| 2004/0019998 A1 | 2/2004 | Sander |
| 2005/0076465 A1 | 4/2005 | Rousey |
| 2009/0265871 A1 | 10/2009 | Wooten |
| 2010/0192980 A1 * | 8/2010 | Turner ............... A47L 11/4036 134/21 |
| 2012/0312243 A1 * | 12/2012 | Rusch ................... A01K 63/06 119/204 |
| 2013/0047332 A1 * | 2/2013 | Mirabito ................ E03C 1/055 4/650 |
| 2013/0180461 A1 * | 7/2013 | Fujiyoshi ............. A01K 61/54 119/234 |
| 2014/0263105 A1 | 9/2014 | Kontorovich et al. |
| 2018/0146689 A1 | 5/2018 | McDonald |
| 2018/0360291 A1 * | 12/2018 | McDonald ......... A22C 21/0061 |
| 2021/0015056 A1 * | 1/2021 | Main .................... A01G 9/247 |

* cited by examiner

WASHING BUCKET FOR HOUSEHOLD, COMMERCIAL AND INDUSTRIAL USE FOR CLEANING MOPS AND FOR CHEMICAL CLEANING

CROSS-REFERENCE TO RELATED APPLICATIONS

The present application is a continuation-in-part of U.S. patent application Ser. No. 14/877,519, filed on Oct. 7, 2015, and entitled "Apparatus and Method for Washing Meat and/or Produce", presently U.S. patent application Ser. No. 14/877,519 is a continuation-in-part of U.S. patent application Ser. No. 14/812,545, filed on Jul. 29, 2015, and entitled "Apparatus and Method for Cleaning Produce". U.S. patent application Ser. No. 14/812,545 issued as U.S. Pat. No. 9,408,412 on Aug. 9, 2016. U.S. patent application Ser. No. 14/812,545 is a continuation-in-part of U.S. patent application Ser. No. 14/550,159, filed on Nov. 21, 2014. U.S. patent application Ser. No. 14/550,195 issued as U.S. Pat. No. 9,321,286 on Apr. 26, 2016 and is entitled "Apparatus and Method for Cleaning Game". The present application also claims priority from U.S. Provisional Patent Application Ser. No. 62/640,261, filed on Mar. 8, 2018 and entitled "Washing Bucket for Household, Commercial and Industrial Use for Cleaning Mops and for Chemical Cleaning".

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to washing buckets. More particularly, the present invention relates to mop buckets. Additionally, the present invention relates to mop buckets in which a continuous supply of fresh water is provided during the washing and rinsing of the mop. The present invention also relates to chemical cleaning operations in commercial and industrial settings.

2. Description of Related Art Including Information Disclosed Under 37 CFR 1.97 and 37 CFR 1.98

A mop bucket is used in conjunction with a mop for cleaning floors and the like. At the start of the cleaning process, fluid used for mopping is held within the bucket and is generally clean. However, as the floor is mopped, and the mop is repeatedly dipped into the bucket, the fluid therein becomes less and less clean as dirt and other matter is transferred from the floor to the wet mop and then to the fluid in the bucket. Occasionally, a user may place the mop into a wringer located above the bucket in order to remove fluid from the mop, but again, this merely transfers dirty fluid to the fluid within the bucket.

The problem often encountered with the use of cleaning buckets is that the dirt deposited on the mop bucket liquid collects at the bottom of the container and that turbulence of the liquid, as when rinsing out a mop, washes the dirty water back into the main body of liquid where it may again be absorbed into the mop. The mop then spread the dirt back out on the floor, leaving unsightly streaks and leading to incomplete cleaning. In an attempt to alleviate this problem, the mop bucket has to be repeatedly emptied and cleaned out.

The problem is twofold. First, the there is the difficulty of separating the heavy components, such as dirt or grease attached to the dirt, from cleaner water in the mop bucket. The second difficulty is turbulence within the water caused by the swishing of the mop within the bucket or residual sloshing movement of water after the bucket has been moved. The turbulence tends to disturb soil, sludge and other heavy components of dirty water and evenly distribute them within the body of water to be picked up again when the mop is rinsed in the bucket, even if care is taken up to push the mophead all the way down to the bottom of the bucket.

There is a great need for a mop bucket that provides relatively clean fluid for mopping throughout the cleaning process. Many different types of filtering systems have been employed to recycle fluid in mop buckets. For example, U.S. Pat. No. 3,630,369 teaches a mop cleaning device wherein a supply of cleaning fluid is circulated through a container. However, relatively heavy particles are separated from the fluid by what appears to be a gravity trap while leaving smaller particles still suspended within the fluid. In another example, U.S. Pat. No. 4,161,799 discloses a mop bucket that treats dirty fluid. However the system leaves undesirable matter within the bucket itself.

In the past, various patterns of issued relating to mop buckets and cleaning systems for mop buckets. For example, U.S. Pat. No. 5,333,353, issued on Aug. 2, 1994 to M. Taylor, teaches a mop wringer that has a long operating handle and mounts on the rear wall of the bucket. When so mounted, the wringer is supported on the sidewalls of the bucket at or toward the front of the wringer by support ledges integrally molded into the sidewalls of the bucket below the lower rim thereof. The ringer engages the bucket in the manner which opposes the tendency for the back of the wringer to lift off of the bucket when operating force is applied to the wringer handle.

U.S. Patent Application Publication No. 2005/0076465, published on Apr. 14, 2005 to B. Rousey, describes a mop bucket filtering system. This mop bucket filtering system includes a mop bucket defining a cleaning solution basin. A pump is externally mounted on the bucket and is in fluid communication with the cleaning solution basin. A filter system is exteriorly mounted on the bucket in fluid communication with the cleaning solution basin and is operationally connected to the pump. The pump draws fluid from the cleaning solution basin through the filter system for return to the basin after the cleaning solution has been filtered.

U.S. Pat. No. 6,000,094, issued on Dec. 14, 1999 to R. S. Young, teaches a removal and replaceable filter and filter holder for a mop cleaning bucket. This filter receives dirt settling under gravity from the contained liquid so that the dirt collects in and passes through the filter so as to be trapped therebelow. The holder is a rigid or substantially rigid perforated support structure spaced above and below the dirt-receiving filter. The holder is supported in the bucket in spaced relation to the bottom of the bucket and protects the filter. The filter is a thin, sturdy, semi-rigid and floatable member with many holes so that soiled water passes through and collects in the bottom of the bucket.

U.S. Pat. No. 5,976,266, issued on Nov. 2, 1999 to Anderson et al., provides a method for cleaning and wringing a mop. The mop is provided with a handle, mop strings and a plunger. The plunger is located between the handle and the mop strings. A sleeve having a top and an open bottom end is provided with the sleeve being perforated near the bottom end. The sleeve is tapered so that the bottom end is larger than the top end. The plunger and the mop strings are located inside the sleeve with the plunger positioned near the top end of the sleeve and the mop strings depending from the plunger. The bottom end of the sleeve is located in a liquid so that the liquid enters a bottom portion of the sleeve through the perforations. The handle is moved down so as to compress the mop strings with the plunger, with the mop strings being immersed in the liquid, so as to force dirt from the mop strings out of the sleeve perforations. The handle is moved up so as to raise the plunger inside the sleeve and decompress the mop strings so as to allow the mop strings to absorb liquid from outside the sleeve to the perforations.

Figure 1:
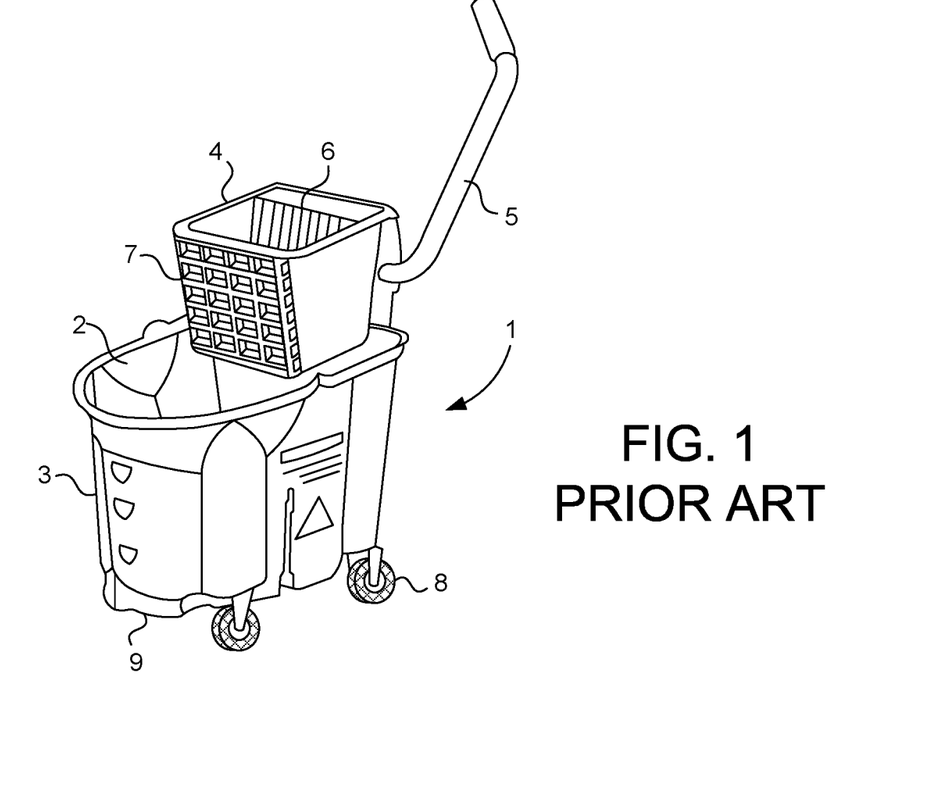
FIG. 1 is a perspective view of a prior art mop bucket.

FIG. 1 is an illustration of a prior art mop bucket 1. This prior art mop bucket 1 can have a wide variety of configurations. Broadly stated, the mop bucket 1 includes a container having a wall extending therearound so as to define an interior volume for receiving a mop therein. In FIG. 1, the mop bucket 1 has interior volume 2 and wall 3. A wringer 4 is supported on the wall 3 so as to be positioned above the interior volume 2. A handle 5 is cooperative with the wringer 4. In normal use, the mop strings of the mop can be placed into the interior 6 of the wringer 4. The handle 5 is then rotated so as to squeeze the mop strings within the interior of the wringer 4. Water from the mop strings can then be discharged through the apertures 7 formed on the wringer and into the mop bucket 1. Wheels 8 are placed at the bottom 9 of the container 3 so as to allow the container 3 to move along an underlying surface.

One of the problems with the mop bucket 1, as shown in FIG. 1, is that when the wringer 4 squeezes the mop strings so as to discharge the dirty water from the mop strings, the dirty water will then enter the interior volume 2 and accumulate therein. A mop is then inserted into the interior volume 2 so as to get more water for mopping purposes. The water that is received by the mop strings when they enter the interior volume 2 of the container 3 will be dirty. This results in the mopping of a floor surface with dirty water, thereby leaving streaks and contamination on the floor. A need has developed so that the interior 2 of the container 3 will have a continuous supply of clean water therein and in which the dirty water caused by the wringing of the mop is discharged from the container 3.

It is an object of the present invention to provide a washing bucket that effectively cleans mop strings of a mop.

It is another object of the present invention to provide a washing bucket that allows a continuous supply of clean water to be delivered to the mop when the mop strings are positioned within the bucket.

It is still another object of the present invention to provide a washing bucket that effectively discharges debris from the interior of the bucket.

It is still a further object of the present invention provide a washing bucket that can be adapted for our domestic, commercial and industrial uses.

It is still another object of the present invention provide a washing bucket that can be used for the chemical cleaning of objects.

It is still a further object of the present invention provide a washing bucket that enhances the ability to effectively mop the floor.

It is still a further object of the present invention to provide a washing bucket that is easy-to-use, relatively inexpensive and easy to manufacture.

It is still a further object of the present invention to provide a washing bucket which allows debris and dirty water to be directed to a specific location exterior of the washing bucket.

These and other objects and advantages of the present invention will become apparent from a reading of the attached specification and appended claims.

BRIEF SUMMARY OF THE INVENTION

The present invention is a washing bucket that comprises a container, a fluid inlet affixed to a wall of the container so as to communicate with an interior of the container, and a connector affixed to the fluid inlet at an end of the fluid inlet exterior of the container. The inlet is adapted to deliver a fluid into the interior of the container. The fluid inlet is positioned adjacent to the bottom of the container. The connector is adapted to allow a hose or conduit to be connected to the inlet.

In one embodiment the present invention, a pipe is connected to the fluid inlet. The pipe has a plurality of apertures adapted to direct the fluid from the fluid inlet into the interior of the container. The pipe extends generally vertically upwardly from the fluid inlet. The plurality of apertures are adapted to direct a flow of the fluid toward a portion of the wall of the container spaced from the pipe so as to create a cyclonic flow path of the fluid in the container. The plurality of apertures are in spaced relation to each other along the length of the pipe. Each of the plurality of apertures has a slot. The slot has a length substantially greater than a length of the aperture. There is a plurality of spacers extending transversely to a longitudinal axis of the pipe. The plurality of spacers abut the wall of the container. Each of the plurality of spacers is a fin having an outer edge. One end of the outer edge is closer to the pipe than an opposite end of the outer edge of the fin.

In another embodiment of the present invention, an outlet is affixed to the wall of the container and positioned adjacent to the upper edge of the container. The outlet communicates with the interior of the container. The outlet is adapted to direct the fluid adjacent to the upper edge of the container outwardly of the container. A drain is affixed to the wall of the container adjacent to the bottom of the container. The drain is adapted to pass fluid outwardly of the container. The outlet has a greater diameter than a diameter of the drain. The outlet is positioned directly above the drain. The fluid inlet is in circumferential relation to the drain. In an embodiment of the present invention, the outlet and the drain are plumbed together. A collecting vessel can be affixed to the end of the outlet opposite the container. The collecting vessel is adapted to collect debris from the fluid passing outwardly of the outlet. In particular, the collecting vessel can be a socket or a screen that is removably affixed around an end of the outlet.

In another embodiment of the present invention, a collecting pan is positioned below a bottom of the container so as to collect fluid and debris flowing over the upper edge of the container. The collecting pan has a collecting area greater than an area of the container at the upper edge of the container. The collecting pan has an outlet. This outlet directs fluid that is collected in the collecting pan outwardly therefrom. The collecting pan has a bottom and sides that extend upwardly from the bottom.

A wringer is affixed to the upper edge of the container. This wringer is positioned above the bottom of the container. The wringer is adapted to wring water and debris from a mop.

This foregoing Section is intended to describe, with particularity, the preferred embodiments of the present invention. It is understood that modifications to these preferred embodiments can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 2:
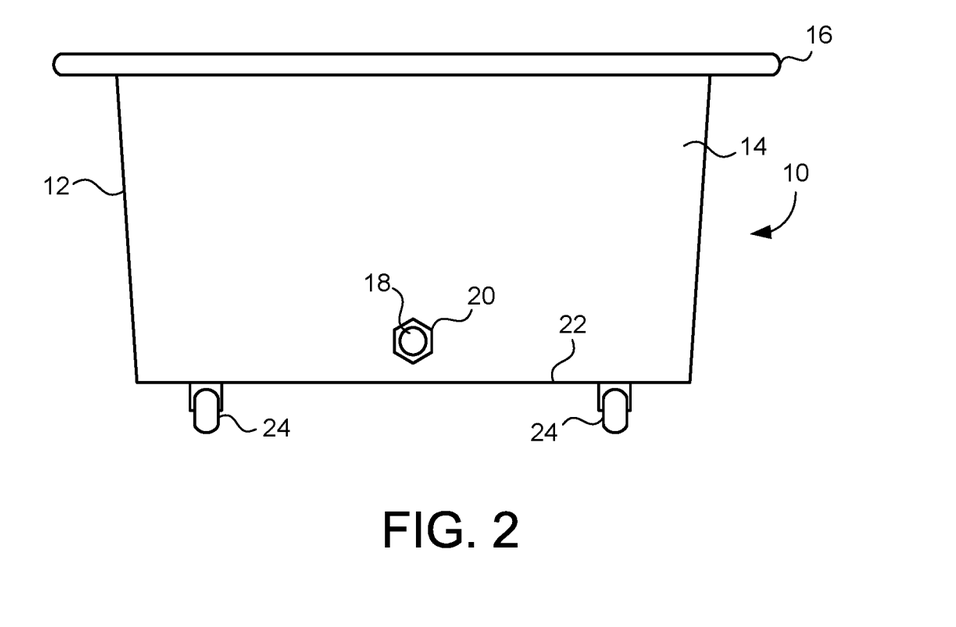
FIG. 2 is an end view of the washing bucket of the present invention.

FIG. 2 shows the washing bucket 10 in accordance with an embodiment of the present invention. The washing bucket 10 includes a container 12 having an interior defined by an outer wall 14. An upper edge 16 is located at the top of the container 12. An inlet 18 opens through the outer wall 14 to an interior of the container 12. The inlet 18 allows water or a cleaning fluid to be introduced into the container 12. A connector 20 is positioned at the inlet 18. The connector 20 allows a hose or a conduit to be connected to the inlet 18 so that the cleaning fluid can be delivered into the interior of the container 12 from a remote location. The connector 20 can be in the nature of a hose coupling. The inlet 18 is located adjacent to the bottom 22 of container 12.

As such, the clean fluid will enter into the interior of the container 12 from the bottom of the container 12 and rise upwardly. Wheels 24 extend downwardly from the bottom 22 of the container 12 so as to allow the container 12 to move along an underlying surface.

Figure 3:
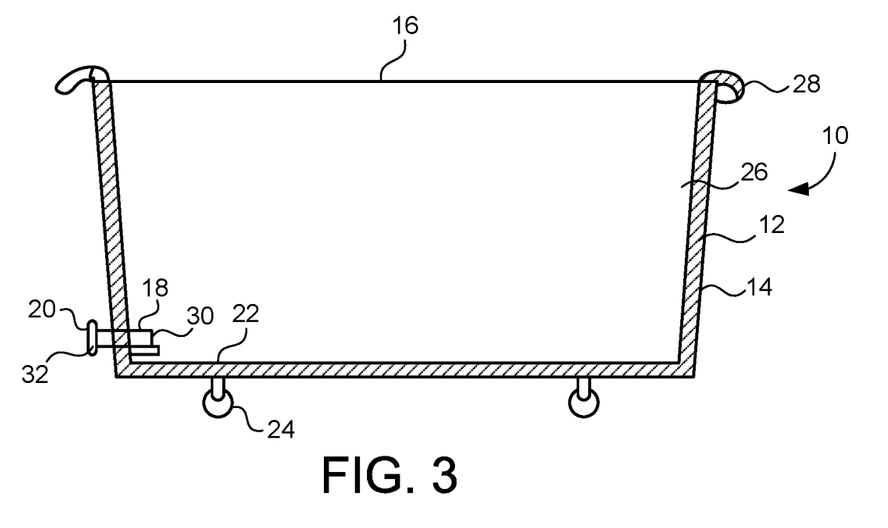
FIG. 3 is an interior view of the washing bucket of the present invention.

FIG. 3 shows the interior view of the washing bucket 10 of the present invention. In FIG. 3, it can be seen that the washing bucket 10 has an interior 26 that is defined by the outer wall 14 of container 12. The upper edge 16 is located at the top of the container 12. A lip 28 extends outwardly of the upper edge 16 of the container 12. The inlet 18 is positioned adjacent to the bottom 22 of container 12. Wheels 24 support the bottom 22 of the container 12 above an underlying surface. The inlet 18 includes the connector 20 located on the exterior end of the inlet 18. The inlet 18 has an interior and 30 and an outer end 32. A hose or conduit can be connected to the outer end 32 by way of the connector 20.

Figure 4:
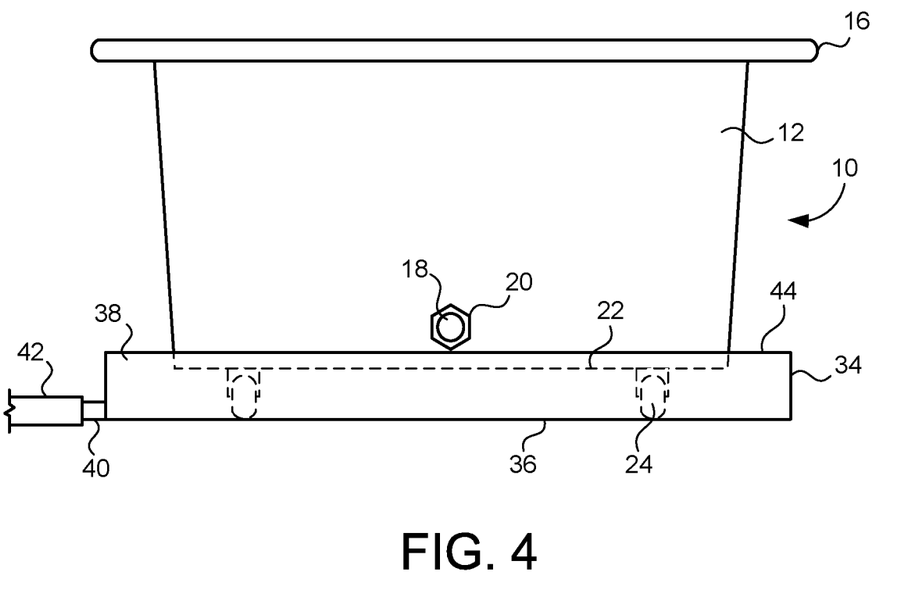
FIG. 4 is an end view showing the placement of the washing bucket into a collection pan in accordance with the present invention.

FIG. 4 shows the washing bucket 10 as placed within a collecting pan 34. Collecting pan 34 has a bottom 36 and sides 38 extending upwardly from the bottom 36. An outlet 40 opens to the interior of the collecting pan 34 adjacent to the bottom 34. The outlet 40 has a hose or conduit 42 connected thereto so that any fluid that is collected by the collecting pan 34 can be discharged outwardly therefrom to a remote location.

The container 12 is positioned within the collecting pan 34. In particular, the wheels 24 will of abut the bottom 36 of the collecting pan 34 so that the bottom 22 of the container 12 is spaced slightly above the bottom 36 of the collecting pan 34. The inlet 18 will be positioned above an upper edge 44 of the collecting pan 34. As such, the collecting pan 34 will not interfere with the ability to connect a hose or conduit to the connector 20 of the inlet 18.

The area of the collecting pan 34 should be greater than the area defined by the upper edge 16 of the container 12. As such, as water rises within the container 12 and overflows the upper edge 16, the collecting pan 34 will receive the discharged dirty fluid therein. As such, the area of the floor that is to be mopped will not receive the dirty fluid as discharged from the container 12. The hose or conduit 42 can be directed to an exterior location or to a drain within the area to be mopped.

Figure 5:
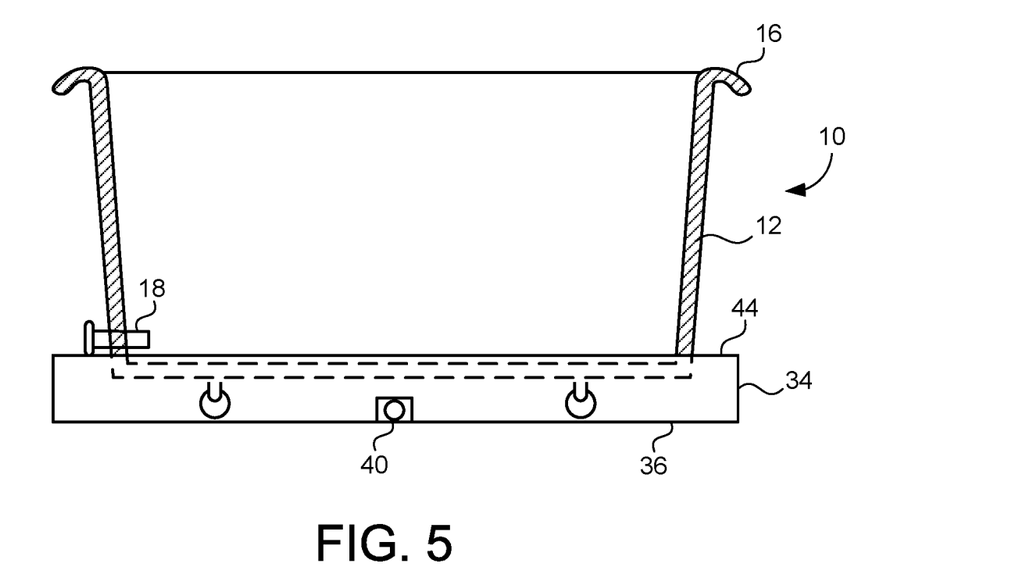
FIG. 5 is a side view showing the placement of the washing bucket into the collection pan.

FIG. 5 further shows relationship of the collecting pan 34 relative to the container 12. The container 12 extends upwardly from the collecting pan 34. The collecting pan 34 is illustrated as having an area greater than the area of the upper edge 16 of the container 12. The inlet 18 is positioned adjacent to the top edge 44 of the collecting pan 34. The outlet 40 of the collecting pan 34 is located generally adjacent to the bottom 36 of the collecting pan 34.

Figure 6:
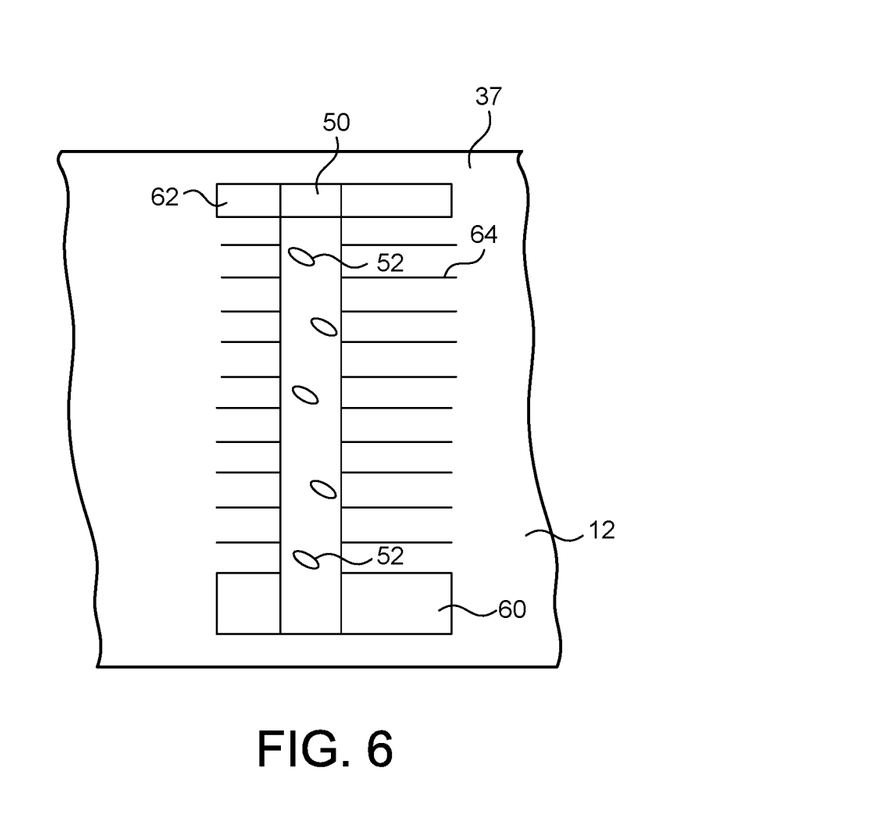
FIG. 6 is a broken-away view of the pipe of the washing bucket of the present invention.

In another embodiment of the present invention, a pipe 50 can be connected to the inlet 18. As such, the pipe 50 can allow water to be delivered into the interior of the container 12 in a cyclonic fashion. FIG. 6 particularly illustrates the configuration of the pipe 50 is positioned against the inner wall 37 of the container 12. It can be seen that the pipe 50 includes apertures 52 arranged in a particular manner. There is a lower portion 60 that is positioned adjacent to the inner wall 37 and an upper portion 62 that is positioned against the inner wall 37. Portions 60 and 62 are at opposite ends of the pipe 50. A plurality of spacers 64 extend outwardly of the pipe 22 and, as will be described hereinafter, serve to bear against the inner wall 37 of the container 12. Importantly, in view of the flow of water is emitted from the apertures 52, a cyclonic path of water flow will occur within the container 12. Under certain circumstances, it may be possible that debris, particles, or objects that are embedded within the mopped strings could become wedged between the surfaces of the pipe 50 and the inner wall 37 of the container 12. The spacers 64, which are in the nature of fins, serve to convey objects and debris in a direction over and away from the pipe 50. As such, this avoids any possible lodging of the objects or debris between the inner wall 37 and the pipe 50 which could serve to impede the water flow from the apertures 52. These spacers or fins 64 serve to create a desired laminar flow pattern of the fluid within the container 12.

Figure 7:
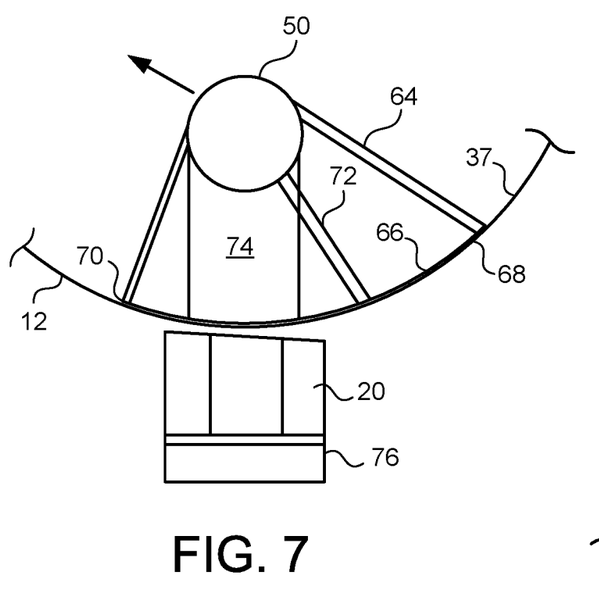
FIG. 7 is a plan view showing the pipe as secured to the wall of the washing bucket of the present invention.

FIG. 7 illustrates the end view of the pipe 50 as positioned against the inner wall 37 of the container 12. It can be seen that the spacers 62 have a fan-shaped configuration so as to extend to an outer edge 66. One end 68 of the outer edge 66 is spaced further from the pipe 50 than the opposite end 70 of the spacers 64. A rib 72 extends across the spacers 64 so as to enhance the structural stability of the spacer. A conduit 74 extends from the pipe 50. Conduit 74 communicates with the interior of the pipe 50. The connector 20 is affixed to the conduit 74 so as to extend outwardly of the container 20. The connector 20 has a fitting 76 thereon which can serve to receive a water hose or conduit. As such, this allows water or chemicals to be introduced into the interior of the pipe 50.

Figure 8:
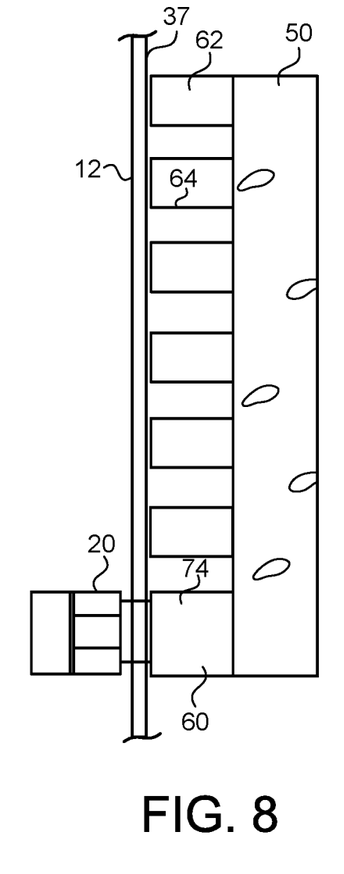
FIG. 8 is a side view of the inlet and pipe secured to the wall of the washing bucket of the present invention.

FIG. 8 further illustrates how the pipe 50 is supported against the inner wall 37 of the container 12 through the use of the spacers 64. The upper portion 62 of the pipe has an end that abuts the inner wall 37 of the container 12. The lower portion 60 will abut a lower portion of the inner wall 37. Spacers 64 extend in parallel relationship between the upper portion 62 and the lower portion 60. The lower portion 60 defines the conduit 74 which extends from the connector 20 to the interior of the pipe 50.

Figure 9:
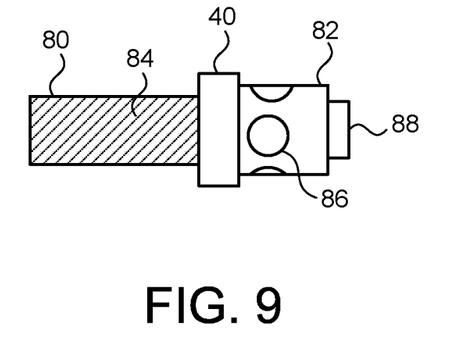
FIG. 9 is an isolated side elevational view of the outlet of the collection pan.

FIG. 9 illustrates the outlet that is used on the collecting pan 34. The outlet 40 has a first end 80 and a second end 82. The first end 80 has threads 84 thereon. Threads 84 are adapted to accommodate the threaded fitting of a water hose. As such, if it is desired to cause the draining of the collecting pan 34 toward a remote location, a water hose can be connected to the outlet 80 at the first end 80 and then draped or routed to a desired location for disposing of the dirty water. As an example, if a user does not wish to drain the container 12 on the floor or surface to be mopped, a hose can be connected to the threaded connection 84 and moved so that the water can be released into a sewer system, a lawn, a body of water, or other location.

It can be seen that the second end 82 will be located within the interior of the collecting pan 34. The second end 82 includes a plurality of openings 86 formed therethrough. The plurality of openings 86 will open to an interior passageway extending through the outlet 40. Another opening 88 can be located at the end of the interior passageway of the outlet 40. If any of the openings 86 and 88 should become clogged, the drain can still properly operate to the use of the other openings.

The outlet 40 can be adapted to allow the user to clean the interior of the collecting pan 34 after use. After the debris has been removed from the mop strings and passes over the upper edge of the container 12, a certain amount of the debris will drift to the bottom of the collecting pan 34 and reside thereon. The outlet 40 can be used so as to drain the water from the collecting pan 34 in a desired manner. Furthermore, this outlet can also be utilized so as to allow for water to be introduced into the collecting pan 34 shows as to clean the interior of the collecting pan. For example, a water hose can be connected to the threaded fitting 84 at the first end 80 so as to introduce water, under pressure, through the outlet 40 and through the openings 86 and 88. As such, the present invention facilitates the proper cleaning of the interior of the collecting pan 34.

Figure 10:
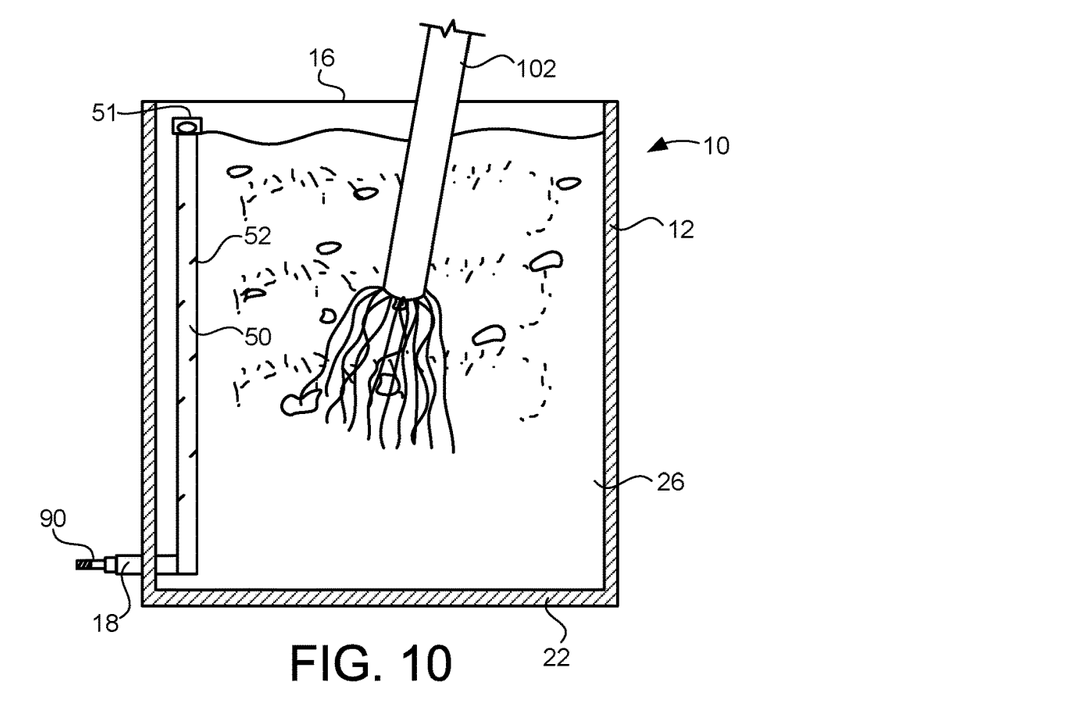
FIG. 10 is a cross-sectional view showing the mop and an initial step of the cleaning process of the present invention.

FIG. 10 shows a step in the cleaning of mop strings 100 of a mop 102. In FIG. 10, the washing bucket 10 includes the container 12 and the pipe 50 in the manner described herein previously. A garden hose 90 is connected to the inlet 18. As such, the water hose 90 can deliver water under pressure through the inlet 18 and into the interior of the pipe 50. In FIG. 10, it can be seen that the pipe 50 includes a closure 51 at an upper end thereof. Ultimately, the upper end of the pipe 50 should be disposed below the upper edge 16 of the container 12. When the cyclonic water passes, created in the manner described herein previously, the extension of the pipe 50 above the upper edge 16 would restrict the dispersion of the debris and release the debris. In other words, the cyclonic path of the flow of the debris would encounter the upper end of the pipe 50 and tend to clump and gather together in such an area. As such, within the concept of the present invention, the upper end of the pipe 50 should be disposed at a certain distance below the upper edge 16 of the container 12.

In FIG. 10, water and/or cleaning fluid has been introduced through the apertures 52 of the pipe 50 and into the interior 26 of the container 12. The introduction of the water in the cyclonic flow path causes the debris on the mop strings 10 to generally tumble in the interior 26 of the container 12. The fan-type flow of water from the pipe 50 will serve to pressure-wash the mop strings 100. Additionally, the debris 106, in the nature of dirt, particles, objects, and organic materials, will tend to move upwardly toward the upper edge 16 of the container 12. This is because the debris 106 is generally less dense than water. The cyclonic flow of water within the container 12 also serves to urge the debris 106 upwardly. The continual flow of water into the interior 26 in the container 12 will continually dilute the debris within the container 12. As such, the debris will mix with the water and can be discharged in the manner shown in FIG. 11.

Figure 11:
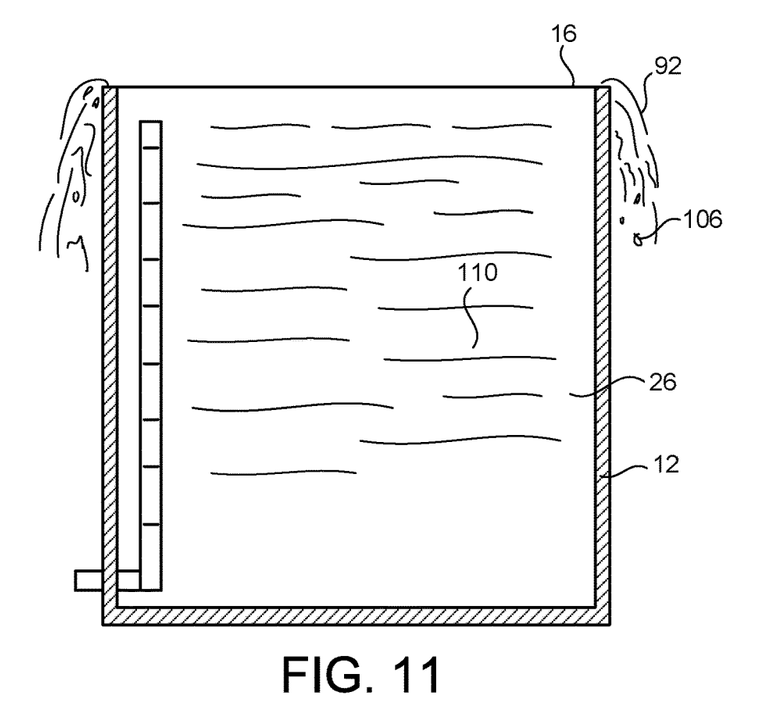
FIG. 11 is a cross-sectional view showing a further step of the cleaning process of the present invention.

In FIG. 11, it can be seen that the water 92 from the interior 26 of the container 12 overflows the upper edge 16 of the container 12. This overflow will serve to discharge the debris 106 outwardly of the container 12. Ultimately, after a period of time, the debris will continue to dilute until only clean water resides with the interior 26 of the container 12. After the debris 106 has been discharged over the upper edge 16 of the container 12, and after the water flow has become sufficiently clear, the mop strings 100 can then be reintroduced into the interior 26 for further washing. As a result of the present invention, whenever the mop strings 100 enter into the water 110 in the interior 26 of the container 12, the mop strings will encounter clean water. As such, the debris will be discharged from the mop strings 100 into the water 110 and the mop can be used so as to further mopped a floor or clean a surface. Ultimately, this will cause the mopped strings to create a cleaner floor and to avoid streaking. The debris 106 can be collected in the collecting pan 34 and discharged to another location. The present invention avoids the need to continuously refill the washing bucket 10 throughout the mopping cycles. This allows for the more efficient and rapid cleaning of the surface with the mop.

It is contemplated in the present invention that objects can also be introduced into the interior 26 of the container 12 for cleaning Under such circumstances, the debris from the objects will be removed from the objects and will overflow the top edge 16 of the container in the manner described herein previously. After the water within the container become sufficiently clear, the object can be removed from the interior of the container. As such, the present invention can be adapted for industrial cleaning purposes for the cleaning of various objects, such as parts, tools, and other devices. Chemicals can also be introduced into the interior of the container for chemical cleaning purposes.

Figure 12:
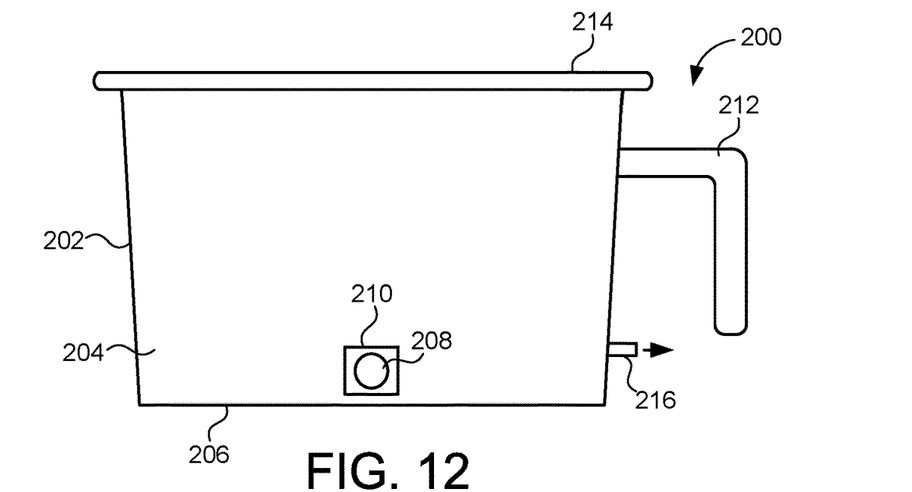
FIG. 12 is a side elevational view of an alternative embodiment of the washing bucket of the present invention.

Referring to FIG. 12, there is shown at the washing bucket 200 in accordance with an alternative embodiment of the present invention. Under certain circumstances, the washing bucket of the previous embodiment may be used in environments where the use of the collecting pan is not possible or in areas where the spillage of the debris and water over the upper edge of the container is not desired. Also, under certain circumstances, it is desirable to be able to direct the flow of debris and dirty water to a location exterior of the bucket rather than to be collected beneath the bucket. As such, the washing bucket 200 is configured so as to avoid the overflow of the upper edge of the bucket while properly directing the flow of dirty water and debris to a location away from the washing bucket.

The washing bucket 200 includes a container 202 having an interior volume that is defined by a wall 204 and a bottom 206. A fluid inlet 208 is affixed to the wall 204 of the container 202 so as to communicate with the interior of the container. The inlet 208 is adapted to deliver a fluid into the interior of the container 202. It can be seen that the inlet 208 is positioned adjacent to the bottom 206 of the container 202. A connector 210 is affixed to the fluid inlet 208 at the end of the fluid inlet 208 exterior of the container 202. The connector 210 allows a hose or a conduit to be connected to the inlet.

In FIG. 12, it can be seen that there is an outlet 212 as affixed to the wall 204 of the container 202 and positioned adjacent to the upper edge 214 of the container 202. The outlet 212 communicates with the interior of the container 202. The outlet 212 directs the fluid adjacent to the upper edge 214 of the container 202 outwardly of the container. A drain 216 is affixed to the wall 204 of the container 202 adjacent to the bottom 206 of the container. The drain 216 passes fluid outwardly of the container. It can be seen that the outlet 212 has a greater diameter than the diameter of the drain 216. The outlet 212 is positioned directly above the drain 216. The fluid inlet 208 is spaced circumferentially from the drain 216.

In FIG. 12, the arrows show how the debris and dirty water is discharged from the interior of the container 202 through the outlet 212. As such, unlike the previous embodiment the present invention, the dirty water and debris will not overflow the upper edge 214 of the container 202. When the fluid within the interior of the container 202 reaches the level of the outlet 212, the debris and dirty water will then flow outwardly of the container 202 and downwardly from the fluid outlet 212. The fluid outlet 212 can be directed to another conduit or toward a desired discharge area, such as a drain, so that the dirty water and debris will not inadvertently splash into the area around the washing bucket 200. The drain 216 can be closed so as to allow for the quick filling of the washing bucket 200. The drain 216 can be open so as to allow debris that is heavier than water, to be discharged from the bottom 206 of the container 202. In fact, during the use of the washing bucket 200, both the outlet 212 in the drain 216 can be open so as to simultaneously discharge debris and dirty water from the interior of the container 202. As such, this allows clean water to be continuously introduced into the interior of the container 202 while allowing lighter-than-water debris to be discharged through the outlet 212 and heavier-than-water debris to be discharged from the drain 216. As such, the washing bucket 200 of this alternative embodiment of the present invention effectively removes the dirty water and debris from the interior of the washing bucket 200.

Figure 13:
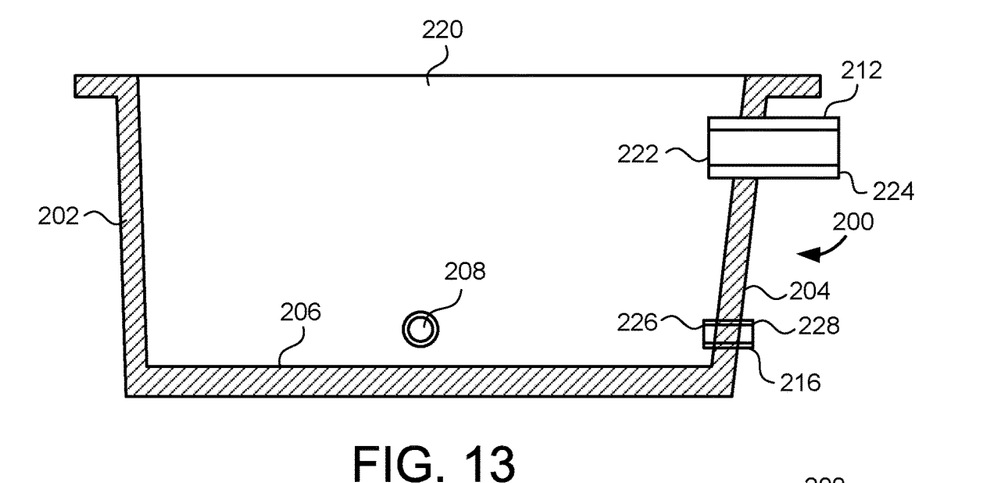
FIG. 13 is a cross-sectional view of the alternative embodiment of the present invention of FIG. 12.

FIG. 13 shows the interior of the washing bucket 200 of this alternative embodiment of the present invention. It can be seen that the fluid inlet 208 is positioned adjacent to the bottom 206 of the interior volume 220 of the container 202. The outlet 212 is illustrated as affixed to the wall 204 of the container 202 so as to have one end 222 and an opposite end 224 that is positioned exterior of the container 202. Similarly, the inlet 216 has one end 226 opening to the interior 220 of the container 212 and an opposite end 228 opening to the exterior of the container 202. The drain 216 is affixed to the wall 204 of the container 202.

Figure 14:
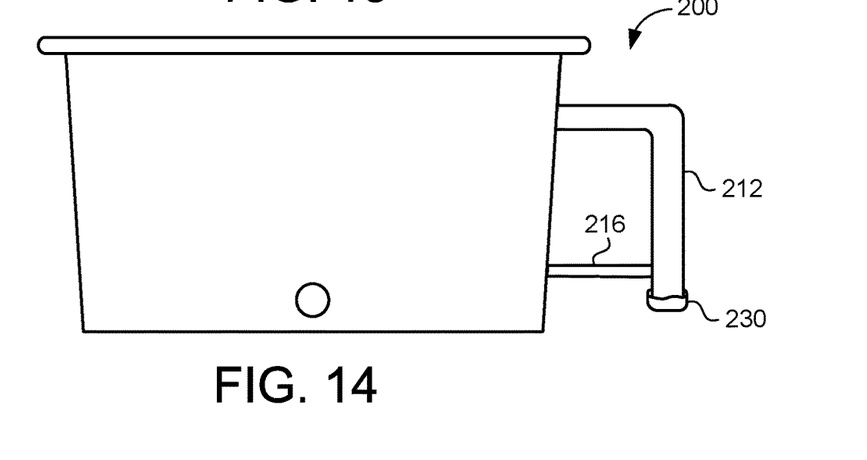
FIG. 14 is a side elevational view of a further embodiment of the present invention in which the drain and the outlet are plumbed together.

FIG. 14 shows a further variation of the washing bucket 200 of the present invention. In FIG. 14, it can be seen that the outlet 212 is actually plumbed to the drain 216. As such, both the lighter-than-water debris, the heavier-than-water debris, and the dirty water are simultaneously directed through the outlet 220 so as to be simultaneously discharged to a desired location. A collecting vessel 230 can, if desired, be placed over the end of the outlet 212. Collecting vessel 230 can be in the nature of a sock or a screen that allows water to flow therethrough while collecting debris therein. As such, this allows debris to be collected, rather than passing to the sewer system associated with the washing bucket 200. The collecting vessel 230 can also be used in those situations where the debris that might be found within the washing bucket 200 can have certain value in other applications.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. A mop washing bucket comprising:
    a container having an interior defined by a wall and a bottom, said container having an upper edge;
    a fluid inlet affixed to said wall of said container so as to communicate with the interior of said container, said fluid inlet adapted to deliver a fluid into the interior of said container, said fluid inlet positioned adjacent to the bottom of said container said fluid inlet having one end in the interior of said container and an opposite end extending outwardly of the wall of said container; and
    a connector affixed to the opposite end of said fluid inlet and located outside of the wall of said container, said connector adapted to allow a water hose to be connected to said fluid inlet.

2. The mop washing bucket of claim 1, further comprising:
    a pipe connected to said fluid inlet, said pipe having a plurality of apertures adapted to direct the fluid from said fluid inlet into the interior of said container.

3. The mop washing bucket of claim 2, said pipe extending generally vertically upwardly from said fluid inlet.

4. The mop washing bucket of claim 3, said plurality of apertures adapted to direct a flow of the fluid toward a portion of said wall spaced from said pipe so as to create a cyclonic flow path of the fluid in said container.

5. The mop washing bucket of claim 4, said plurality of apertures being in spaced relation to each other along a length of said pipe.

6. The mop washing bucket of claim 2, each of said plurality of apertures having a slot, the slot having a length substantially greater than a length of the aperture.

7. The mop washing bucket of claim 2, said pipe having a plurality of spacers extending transversely to a longitudinal axis of said pipe, said plurality of spacers abutting the wall of said container.

8. The mop washing bucket claim 7, each of said plurality of spacers comprising a fin having an outer edge, one end of the outer edge being closer to said pipe than an opposite end of the outer edge of the fin.

9. The mop washing bucket claim 1, further comprising:
an outlet affixed to the wall of said container and positioned adjacent to the upper edge of said container, said outlet communicating with the interior of said container, said outlet adapted to direct the fluid adjacent the upper edge of said container outwardly of said container.

10. The mop washing bucket of claim 9, further comprising:
a drain affixed to the wall of said container adjacent to the bottom of said container, said drain adapted to pass the fluid outwardly of said container.

11. The mop washing bucket of claim 10, said outlet having a greater diameter than a diameter of said drain.

12. The mop washing bucket of claim 10, said outlet and said drain being plumbed together.

13. The mop washing bucket of claim 9, further comprising:
a collecting vessel affixed to an end of said outlet opposite said container, said collecting vessel adapted to collect debris from the fluid passing outwardly of said outlet.

14. The mop washing bucket of claim 13, said collecting vessel being a sock or a screen removably affixed around an end of said outlet.

15. The mop washing bucket of claim 1, further comprising:
a collecting pan positioned below a bottom of said container so as to collect fluid and debris flowing over said upper edge of said container.

16. The mop washing bucket of claim 15, said collecting pan having a collecting area greater than an area of said container at the upper edge of said container.

17. The mop washing bucket of claim 15, said collecting pan having an outlet, said outlet directing fluid collected in said collecting pan to flow outwardly therefrom.

18. The mop washing bucket of claim 15, said collecting pan having a bottom and sides that extend upwardly from the bottom of said collecting pan.

19. The mop washing bucket of claim 1, further comprising:
a wringer affixed to the upper edge of said container, said wringer positioned above the bottom of said container, said wringer adapted to wring water and debris from a mop.

20. A mop washing bucket comprising:
a container having an interior defined by wall and a bottom, said container having an upper edge;
a fluid inlet affixed to said wall of said container so as to communicate with the interior of said container, said inlet adapted to deliver a fluid into the interior of said container, said fluid inlet positioned adjacent to the bottom of said container; and
a connector affixed to said fluid inlet at an end exterior of said container, said connector adapted to allow a hose or a conduit to be connected to said fluid inlet;
an outlet affixed to the wall of said container and positioned adjacent to the upper edge of said container, said outlet communicating with the interior of said container, said outlet adapted to direct the fluid adjacent the upper edge of said container outwardly of said container; and
a drain affixed to the wall of said container adjacent to the bottom of said container, said drain adapted to pass the fluid outwardly of said container, said fluid inlet being in spaced circumferential relationship to said drain.

* * * * *